J. E. CAPS.
WATER TREATING PROCESS.
APPLICATION FILED MAY 29, 1911.
1,021,761.
Patented Apr. 2, 1912.
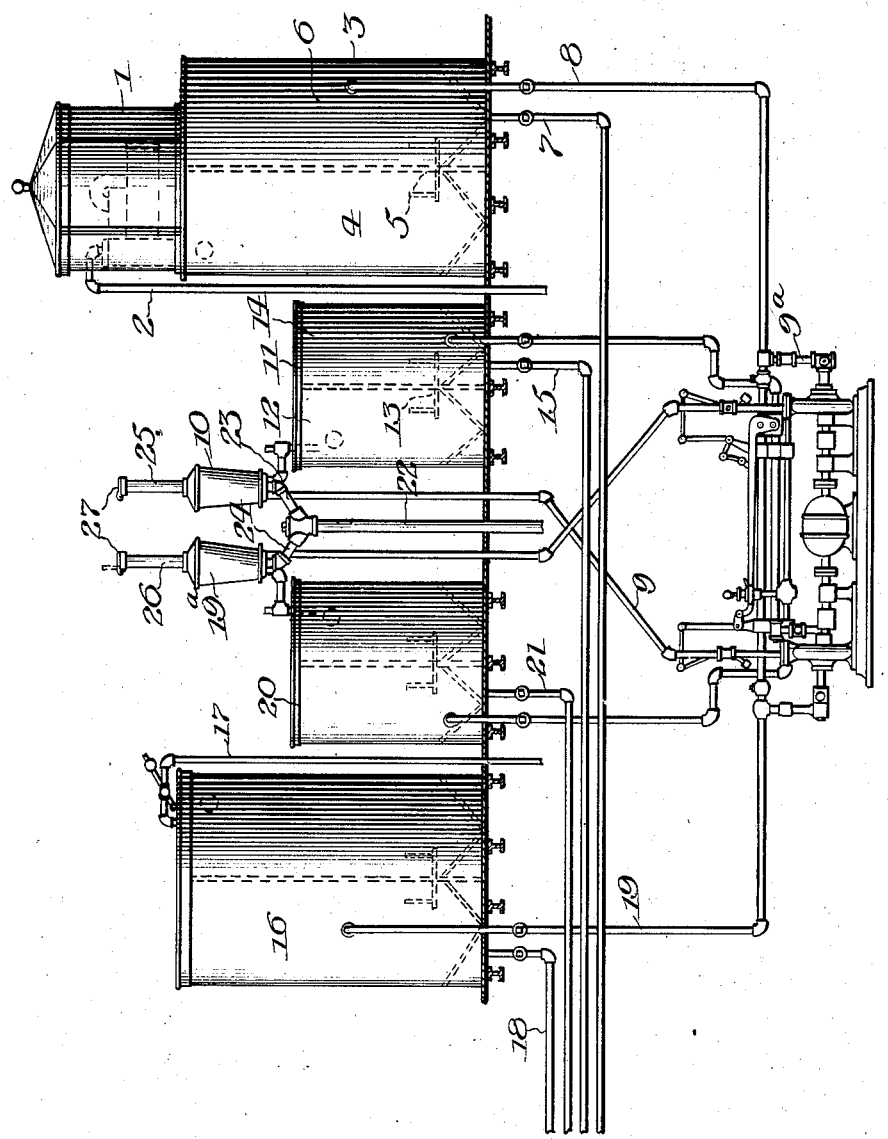
Witnesses
Inventor
John E. Caps,
by Benjamin T. Roundhouse
attys.

UNITED STATES PATENT OFFICE.

JOHN E. CAPS, OF WILMETTE, ILLINOIS.

WATER-TREATING PROCESS.

1,021,761.  Specification of Letters Patent.  Patented Apr. 2, 1912.

Application filed May 29, 1911. Serial No. 630,139.

*To all whom it may concern:*

Be it known that I, JOHN E. CAPS, a citizen of the United States, and a resident of Wilmette, in the county of Cook and State of Illinois, have invented a new and useful Water-Treating Process, of which the following is a specification.

My present invention has relation to the treatment of water for the purpose of removing certain salts therefrom which are often present and render the water what is termed hard, and which materially interfere with the commercial uses to which it is desired to put the water.

As is well known, certain impurities may be largely eliminated by filtration and heating, or by the addition of alkalis, such as sodium and calcium hydrates, and other salts, which will have the effect of precipitating the objectionable impurities of the water, and then eliminating the precipitate by filtration.

The system is especially designed to treat water down to zero or normal, that is to entirely eliminate the hardness for the purpose mentioned.

In the addition of chemicals to the water it is difficult to so measure the amount thereof as to exactly neutralize the substances in the water, and it often happens that an excess of the reagent is objectionable. This is particularly the case in the use of water for laundry and dye purposes. In the original wetting and in the soaping of the material an excess of alkali is not only not objectionable but is beneficial as it facilitates the cleaning and saves soap, but this excess should be thoroughly removed later to prevent its continued presence from injuring the material, and such excess interferes with bluing or dying operations.

The object of my invention is, the provision of a system of water treatment which shall combine the well known modes of water treatment so that their respective advantages will supplement each other.

I accomplish the above object by the process and with the apparatus illustrated in the accompanying drawing which is an elevation of such an apparatus, portions thereof being broken away to expose the interior arrangement of certain of the compartments.

In the drawing the reference numeral 1 designates the tank in which the water is treated with chemicals, which may be of any well known design. Into the chemical tank 1, the water supply flows through the pipe, 2, and from it the water passes by gravity to the settling and filtering tank, 3, where it flows first downwardly in the left hand chamber, 4, to the filter, 5, through which it flows into the right hand chamber, 6. At this stage the water has had a large portion of the hardening salts precipitated and removed by settling and filtration, and the water is generally slightly alkaline by reason of the chemicals which it received in the chemical tank. Extending upwardly into the compartment, 6, is a pipe, 7, which leads directly to the washers or the place where the water is to be used. Also leading from the compartment, 6, is a pipe, 8. This leads to a suitable circulating mechanism, 9ª, such as shown in Patent No. 918,961, of April 20, 1909, from which it is caused to flow upwardly through the pipe, 9, to the heater, 10, from whence it enters the hot water compartment, 11, which is in general construction like the compartment 3. In the tank 11, the water first flows downwardly through a settling chamber, 12, to a filter, 13, from whence it goes to the chamber, 14. From the chamber, 14, a pipe 15, is led to the washers or place where the water is to be used. The heating facilitates the chemical action and some of the hardening materials which were not acted upon when cold, are thrown down and filtered out. By reason of this action the water in the chamber 14, is less alkaline than that obtained from the tank, 3.

Located in convenient proximity to the above described mechanism is a settling and filtering tank, 16, similar in structure to the tank, 3, into which water flows by the pipe 17. From this tank, 16, a pipe, 18, leads to the washers and another pipe 19, leads from said tank, 16, to the circulating mechanism, 9ª, from whence it flows to a heater, 19ª, similar to the heater 10, and from the heater the flow is to the hot water tank, 20, from whence a pipe, 21, leads to the washers. The water flowing from the tank, 16, has had removed from it by filtration all objectionable suspended matter, but as drawn through the pipe, 18, to the washers it contains the materials which render the water hard. By using this water with the water coming from either the tanks 3 or 11, the alkalinity thereof would be entirely neutralized, or by using the hard water as a rinse the alkali can be completely removed from the fabric under treatment. The water in tank 20 by reason of the heating to which it has been subjected has had the carbonic acid gas driven from it and the calcium and magnesium carbonates pretty nearly completely precipitated thereby. This heating leaves a slight hardness which cannot be entirely eliminated by heat, but if the water from tank 20 is run into water from tank 11, one slightly hard and the other with a slight excess of alkali, as near a complete neutralization will occur as can be secured in a practical manner on a commercial scale. This renders the water practically neutral and suitable for bluing and a great many commercial uses.

The heaters 10 and 19$^a$ may be of any suitable construction, but preferably of the style shown in Patent No. 949,217 of February 15, 1910. Their general construction is not material in connection with this application. The heat is supplied by a single exhaust steam pipe, 22, having branches, 23 and 24, leading to the respective heaters. These branches after passing through the heaters terminate in the ends, 25 and 26, which are each closed against the entrance of atmospheric air by the valves, 27. These valves open outwardly to relieve the heater of any pressure that might develop, but prevent the entrance of the air when the water causes the condensation of the steam. When more water is drawn from one side of the system than the other it requires more steam, but this is automatically taken care of by the above arrangement as the cooler the water the greater the condensation and thereby the greater will be the amount of the steam which is drawn into the heater requiring it.

It will be observed that the tanks, 1, and 16, into which the water is first received in the respective sides of the system are located above the other parts so that there is a head of water always tending to aid the flow through the system. The circulating mechanism requires some slight power but the location of the tanks as above described greatly reduces the power required for circulating the water.

Having thus described my invention what I claim as new and desire to secure by Letters Patent, is:—

1. A water treating process comprising the impregnation of a portion of the water treated with alkali for the purpose of neutralizing the carbonic acid gas contained therein and the consequent precipitation of substances soluble in a solution of such gas, the treatment of another portion of the water to be treated with heat to drive off the carbonic acid gas to secure a consequent similar precipitation, and the mixture of the portions of water so respectively treated to neutralize the excess of alkali and acid present after such separate treatments.

2. A water treating process comprising the impregnation of a portion of the water to be treated with alkali, settling and filtering such treated water, the subsequent heating, settling and filtering thereof in combination with settling and filtering another portion of water, the subsequent heating, settling and filtering thereof, and the mixture of the waters so respectively treated.

In testimony whereof I affix my signature in the presence of two witnesses.

JOHN E. CAPS.

Witnesses:
H. DeLos Higman,
Benj. T. Roodhouse.

---

Copies of this patent may be obtained for five cents each, by addressing the "Commissioner of Patents, Washington, D. C."